US011995949B2

(12) United States Patent
Cronin

(10) Patent No.: US 11,995,949 B2
(45) **Date of Patent: *May 28, 2024**

(54) PARALLEL STREAMING

(71) Applicant: AdrenalineIP, Washington, DC (US)

(72) Inventor: John Cronin, Jericho, VT (US)

(73) Assignee: AdrenalineIP, Washington, DC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/714,321

(22) Filed: Apr. 6, 2022

(65) Prior Publication Data

US 2022/0230507 A1 Jul. 21, 2022

Related U.S. Application Data

(63) Continuation of application No. 17/336,757, filed on Jun. 2, 2021, now Pat. No. 11,308,756.

(60) Provisional application No. 63/117,117, filed on Nov. 23, 2020.

(51) Int. Cl.
*G07F 17/32* (2006.01)
*G06Q 50/34* (2012.01)

(52) U.S. Cl.
CPC ......... *G07F 17/3225* (2013.01); *G06Q 50/34* (2013.01); *G07F 17/3211* (2013.01); *G07F 17/3288* (2013.01)

(58) Field of Classification Search
None
See application file for complete search history.

(56) References Cited

U.S. PATENT DOCUMENTS

| | | | |
|---|---|---|---|
| 7,351,149 B1 | 4/2008 | Simon et al. | |
| 10,657,771 B2 | 5/2020 | Kelly et al. | |
| 10,943,435 B2 | 3/2021 | Hall et al. | |
| 2006/0003830 A1 | 1/2006 | Walker et al. | |
| 2011/0246622 A1* | 10/2011 | Pantos | H04L 67/02 709/219 |
| 2011/0246885 A1* | 10/2011 | Pantos | H04N 21/47217 715/716 |
| 2011/0252118 A1* | 10/2011 | Pantos | G06F 3/0484 709/219 |
| 2018/0190077 A1 | 7/2018 | Hall et al. | |
| 2020/0162796 A1 | 5/2020 | Azuolas et al. | |
| 2021/0136456 A1 | 5/2021 | Srinivasan | |
| 2021/0192899 A1 | 6/2021 | Hall et al. | |

OTHER PUBLICATIONS

International Search Report and Written Opinion dated Jan. 5, 2022 in corresponding International Patent Application No. PCT/US2021/060419; 7 pages.

* cited by examiner

*Primary Examiner* — Ronald Laneau
(74) *Attorney, Agent, or Firm* — Maier & Maier, PLLC

(57) ABSTRACT

A system for wagering and viewing the event on the same device while receiving the wagering data on a separate data feed from the video feed. Separate feeds would allow the wagering markets to close in more real-time while not relying on the video latency.

16 Claims, 3 Drawing Sheets

PARALLEL STREAMING

CROSS-REFERENCE TO RELATED APPLICATIONS

Figure 1:
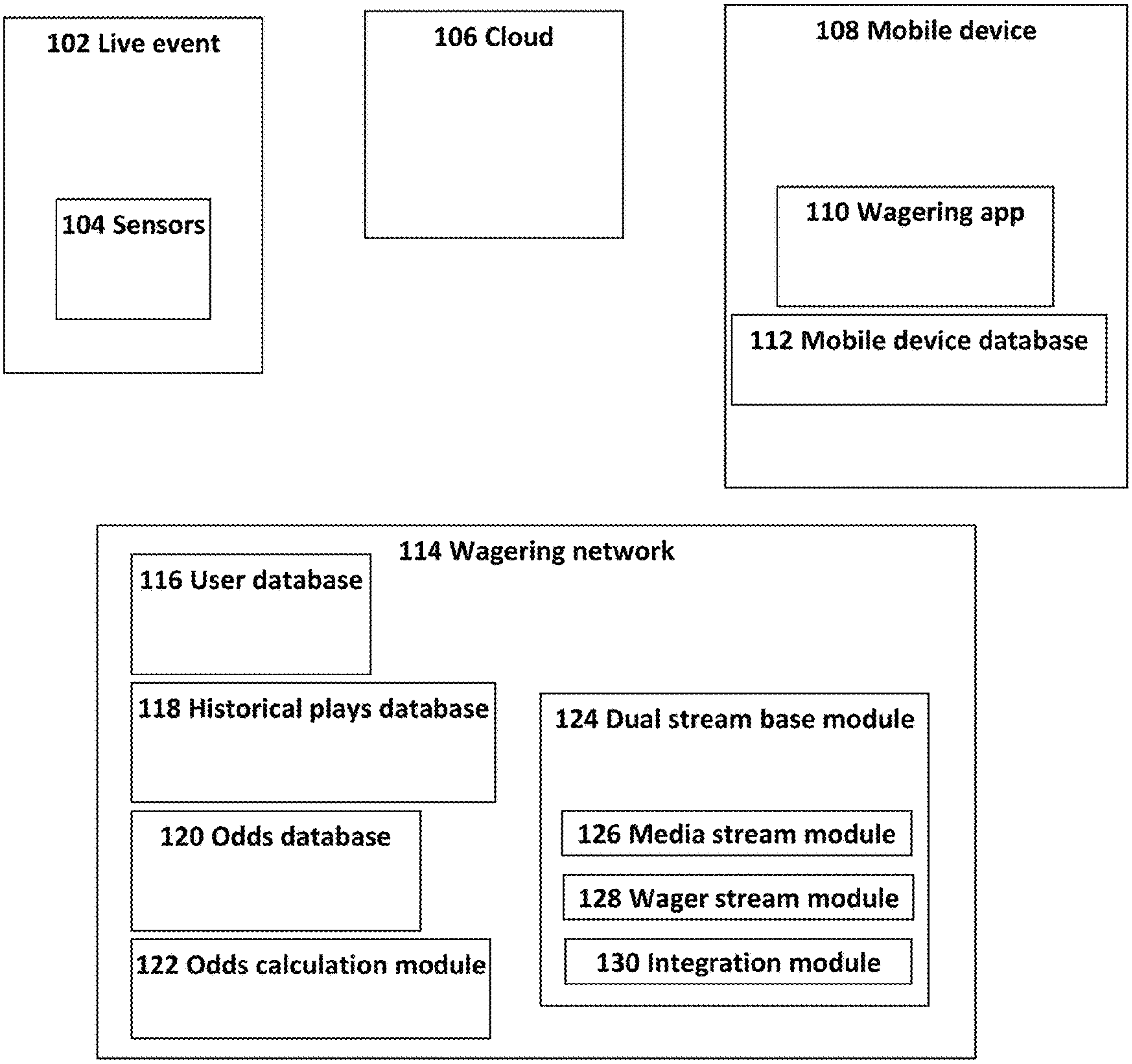

The present patent application claims benefit and priority to U.S. patent application Ser. No. 17/336,757 filed on Jun. 2, 2021, and U.S. Provisional Patent Application No. 63/117,117 filed on Nov. 23, 2020, which is hereby incorporated by reference into the present disclosure.

FIELD

The embodiments are generally related to play-by-play wagering on live sporting events.

BACKGROUND

Real-time betting on single plays or micro-betting has a short betting window. The window opens around the same time as the last play of a live event ends and closes before the play being bet on starts.

One problem that arises with such a small betting window is that latency between the bettor and the offeror of the bet is a significant factor. When a wagering market is only open for a matter of seconds, even latency measured in milliseconds can affect bettor experience.

Further, latency for different types of data may cause multiple data streams to be out of sync. This latency may cause betting markets to open before the video data shows the end of the last play. This asynchronous delivery of data could cause bettors to be distracted and split their attention between the play they are currently watching and betting on the next play or spoil the result of the current play.

SUMMARY

Methods and systems for compensating for network latency in a networked game. One embodiment may include a method for compensating for network latency for a sports betting game. The method may include providing a sports betting game on a network, the sports betting game associated with at least a live sporting event; storing wager data in a database associated with the sports betting game; sending a first stream of data to a mobile device, the first stream of data containing wager data with the mobile device; and sending a second stream of data to the mobile device, the second stream of data containing media data.

Another embodiment may include a system for synchronizing display of multiple data streams on a device. The system may include a device configured to display at least wager data and media data; a wagering game accessible via the device; a first data stream transmitted to the device, the first data stream comprising media data associated with a live sporting event; a second data stream transmitted to the device, the second data stream comprising wager data associated with the live sporting event; and an integration module that delays display of the second data stream on the device until a time when the first data stream is displayed on the device.

BRIEF DESCRIPTIONS OF THE DRAWINGS

The accompanying drawings illustrate various embodiments of systems, methods, and various other aspects of the embodiments. Any person with ordinary art skills will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1: illustrates a dual-stream video and wager data system, according to an embodiment.

Figure 2:
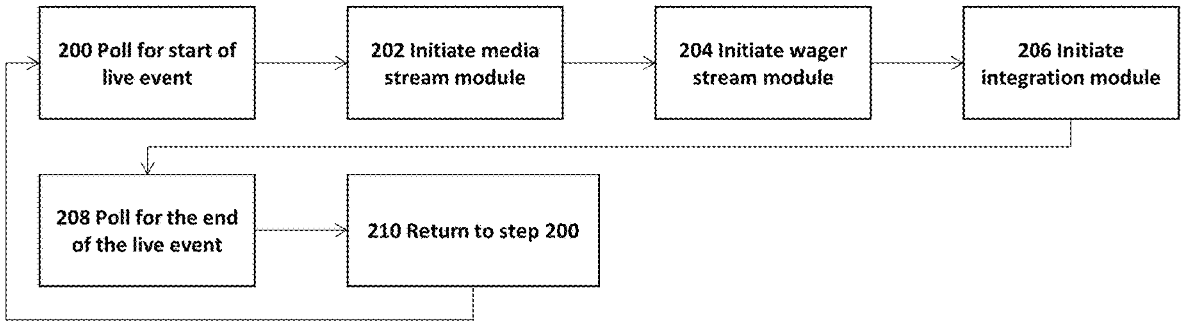

FIG. 2: illustrates a dual-stream base module, according to an embodiment.

Figure 3:
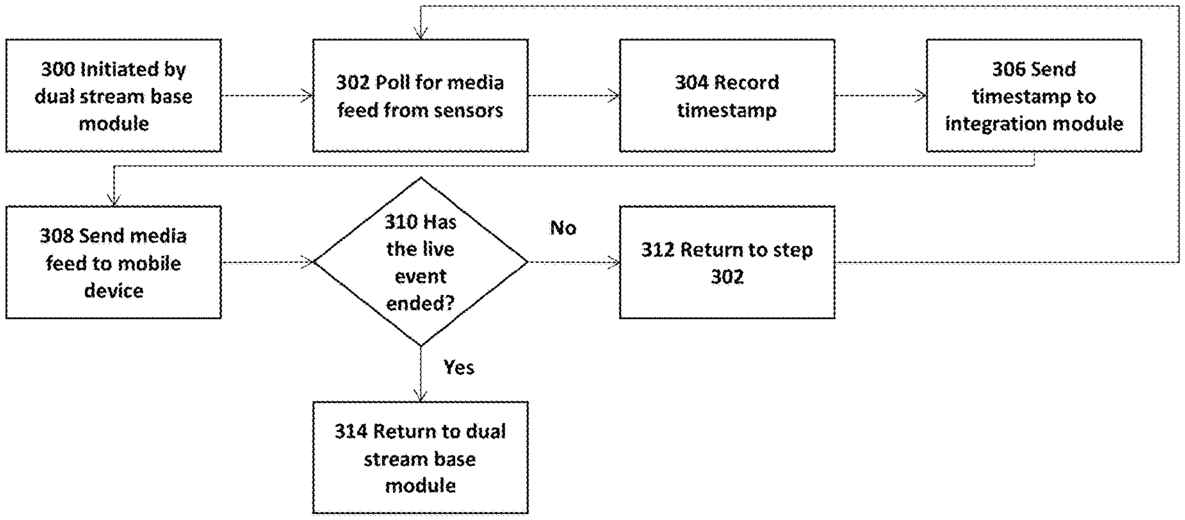

FIG. 3: illustrates a media stream module, according to an embodiment.

Figure 4:
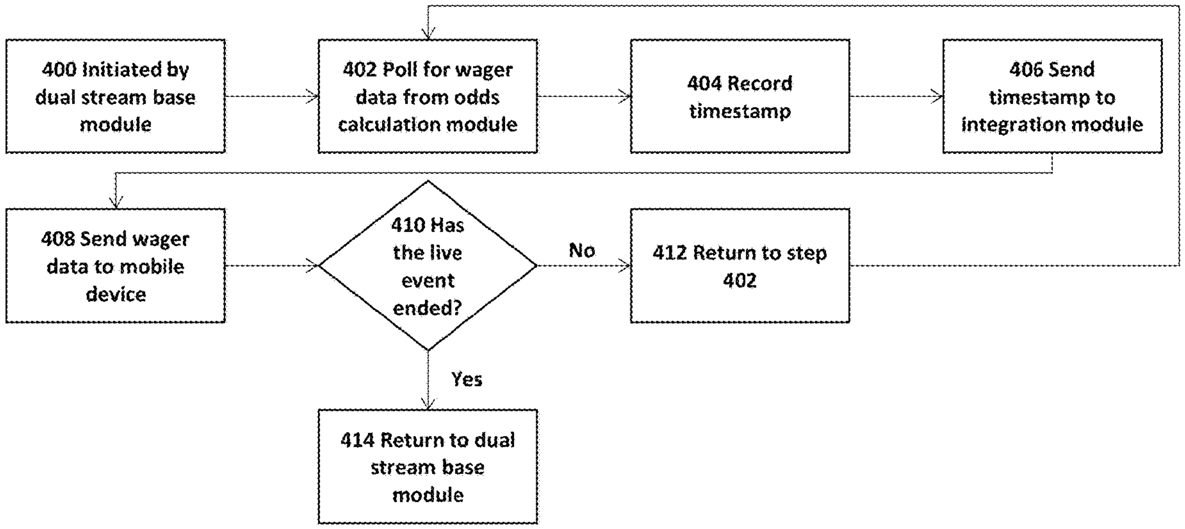

FIG. 4: illustrates a wager stream module, according to an embodiment.

Figure 5:
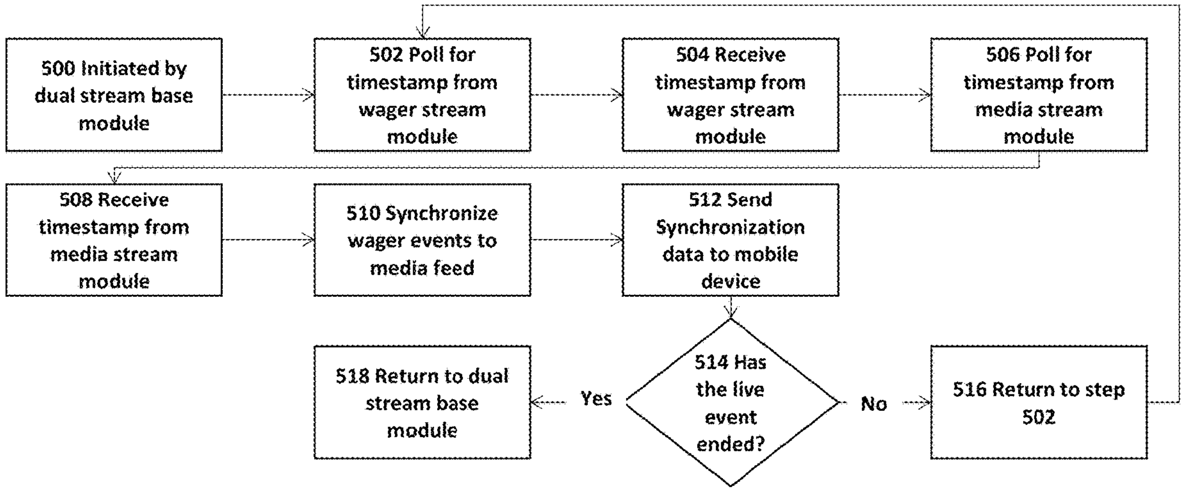

FIG. 5: illustrates an integration module, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "bet" or "wager". A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds.

"Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick" "em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", "vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, or perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are services that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, by creating and delivering actionable insights on performance to help customers to manage the sports gaming. Business Applications can be integrated into the embodiments in a variety of manners.

State based integration allows for a given sports gambling game to be modified by states in the United States or other countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for dual-stream video and wager data. This system may include a live event 102, for example, a sporting event such as a football, basketball, baseball, or hockey game, tennis match, golf tournament, eSports or digital game, etc. The live event 102 may include some number of actions or plays, upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team would need to cover if the result of the game with the same as the point spread the user would not cover the spread, but instead the tie is called a push. If the user bets on the favorite, points are given to the opposing side, which is the underdog or longshot. Betting on all favorites is referred to as chalk and is typically applied to round-robin or other tournaments' styles. There are other types of wagers, including, but not limited to, parlays, teasers, and prop bets, which are added games that often allow the user to customize their betting by changing the odds and payouts received on a wager. Certain sportsbooks will allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle which limit the amount of wagers they can take on either side of a bet before they will move the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point spreads to middle, and win, both bets. Sportsbooks will often offer bets on portions of games, such as first-half bets and half-time bets. Additionally, the sportsbook can offer futures bets on live events in the future. Sportsbooks need to offer payment processing services to cash out customers which can be done at kiosks at the live event 102 or at another location.

Further, embodiments may include a plurality of sensors 104 that may be used such as motion, temperature, or humidity sensors, optical sensors and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include, but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and/or a wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the Internet, and relies on sharing resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 114, which may perform real-time analysis on the type of play and the result of the play. The cloud 106 may also be synchronized with game situational data such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play, and may be compared with a variety of team data and league data based on a variety of elements, including the current down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include, but are not limited to, keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide semiconductor (CMOS) sensors, accelerometers, infrared optical sensors, pressure sensors, magnetometer sensors, angular rate sensors, depth sensors, proximity sensors, ambient light sensors, gyroscopic sensors, or other sensors. Output devices may include, but are not limited to, video displays, graphical displays, speakers, headphones, inkjet printers, laser printers, or 3D printers. Devices may include, but are not limited to, a combination of multiple input or output devices such as, Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs including, but not limited to, Microsoft KINECT, SIRI for iPhone by Apple, Google Now, or Google Voice Search. Additional user devices have both input and output capabilities including, but not limited to, haptic feedback devices, touchscreen displays, or multi-touch displays. Touchscreen, multi-touch displays, touchpads, touch mice, or other touch sensing devices may use different technologies to sense touch, including but not limited to, capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices including, but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device, or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, FireWire, Ethernet, Gigabit Ethernet, Fiber Channel, or Thunderbolt buses. In some embodiments, the mobile device 108 could be an optional component and would be utilized in a situation where a paired wearable device employs the mobile device 108 for additional memory or computing power or connection to the Internet.

Further, embodiments may include a wagering software application or a wagering app 110, which is a program that enables the user to place bets on individual plays in the live event 102, streams audio and video from the live event 102, and features the available wagers from the live event 102 on the mobile device 108. The wagering app 110 allows the user to interact with the wagering network 114 to place bets and provide payment/receive funds based on wager outcomes.

Further, embodiments may include a mobile device database 112 that may store some or all the user's data, the live event 102, or the user's interaction with the wagering network 114.

Further, embodiments may include the wagering network 114, which may perform real-time analysis on the type of play and the result of a play or action. The wagering network 114 (or the cloud 106) may also be synchronized with game situational data, such as the time of the game, the score, location on the field, weather conditions, and the like, which may affect the choice of play utilized. For example, in an exemplary embodiment, the wagering network 114 may not receive data gathered from the sensors 104 and may, instead, receive data from an alternative data feed, such as SportsRadar®. This data may be provided substantially immediately following the completion of any play, and may be compared with a variety of team data and league data based on a variety of elements, including the current down, possession, score, time, team, and so forth, as described in various exemplary embodiments herein. The wagering network 114 can offer several software as a service (SaaS) managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user.

Further, embodiments may include a user database 116, which may contain data relevant to all users of the wagering network 114 and may include, but is not limited to, a user ID, a device identifier, a paired device identifier, wagering history, or wallet information for the user. The user database 116 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the user database 116 may contain betting lines and search queries. The user database 116 may be searched based on a search criterion received from the user. Each betting line may include, but is not limited to, a plurality of betting attributes such as at least one of the live event 102, a team, a player, an amount of wager, etc. The user database 116 may include, but is not limited to, information related to all the users involved in the live event 102. In one exemplary embodiment, the user database 116 may include information for generating a user authenticity report and a wagering verification report. Further, the user database 116 may be used to store user statistics like, but not limited to, the retention period for a particular user, frequency of wagers placed by a particular user, the average amount of wager placed by each user, etc.

Further, embodiments may include a historical plays database 118 that may contain play data for the type of sport being played in the live event 102. For example, in American Football, for optimal odds calculation, the historical play data may include metadata about the historical plays, such as time, location, weather, previous plays, opponent, physiological data, etc.

Further, embodiments may utilize an odds database 120—that contains the odds calculated by an odds calculation module 122—to display the odds on the user's mobile device 108 and take bets from the user through the mobile device wagering app 110.

Further, embodiments may include the odds calculation module 122, which utilizes historical play data to calculate odds for in-play wagers.

Further, embodiments may include a dual-stream base module 124, which may initiate a media stream module 126 to collect media data from the sensors 104 and send that data to the mobile device 108. The dual-stream base module 124 may initiate a wager stream module 128 to collect wager data from the odds calculation module 122 and send it to the mobile device 108. The dual-stream base module 124 may initiate an integration module 130 to synchronize the wagering feed with the media feed from the live event 102.

Further, embodiments may include the media stream module 126, which may supply audio/video of the live event 102 to the wagering app 110. This module may also supply the timestamps of the media stream of the live event 102 related to the audio/video and wagering data. It should be noted the timestamps are of the live event 102, but the timestamps at the game players mobile device 108 may be different due to latency; that is, gameplay may occur at 9:15 pm at the live event 102, but the Media Stream data may reach the mobile device 108 fifty milliseconds (high latency) later.

Further, embodiments may include the wager stream module 128, which may supply wagering data to the wagering app 110. Normally, this data is less likely to have latency because of the small amount of real-time data. This module will also supply its time stamps of wagering events such as the opening and closing of a betting window. It may be noted the timestamps are relative to the live event 102, but the time stamps at the mobile device 108 may be different due to latency; that is, gameplay may occur at 9:15 pm at the live event 102, but the wager stream data may reach the mobile device 108 ten milliseconds (low latency) later. Regardless of when the betting market appears to close on the wagering app 110, wagers may not be accepted from the wagering app 110 after the close of the betting market.

Further, embodiments may include the integration module 130, which may provide the mobile device 108 the information required to integrate the media stream and the wager stream. The module may send timestamps from both the wager and video data from the live event 102. Using these timestamps, the wagering app 110 can adjust the time of the two streams to be synchronized. This synchronization may cause the betting market to appear open longer than it is. A user may customize how this synchronization may occur, for example, the opening of the betting market is synchronized with the video stream, but the closing of the betting market is not.

FIG. 2 illustrates the dual-stream base module 124. The process may begin with the dual-stream base module 124 polling, at step 200, for the start of the live event 102. The dual-stream base module 124 may initiate, at step 202, the media stream module 126 to collect media data from the sensors 104 and send that data to the mobile device 108. The dual-stream base module 124 may initiate, at step 204, the wager stream module 128 to collect wager data from the odds calculation module 122 and send it to the mobile device 108. The dual-stream base module 124 may initiate, at step 206, the media stream module 130 to synchronize the wagering feed with the media feed from the live event 102. The dual-stream base module 124 may poll, at step 208, for the end of the live event 102. The dual-stream base module 124 may poll for each initiated module to return to the dual-stream base module 124. The dual-stream base module 124 may return, at step 210, to step 200. The dual-stream base module 124 may instead end at this step and be re-initiated manually or by another module.

FIG. 3 illustrates the media stream module 126. The process may begin with the media stream module 126 being initiated, at step 300, by the dual-stream base module 124. The media stream module 126 may poll, at step 302, for a feed of media data from the sensors 104. This feed of data may be received continuously. The media stream module 126 may record, at step 304, a timestamp when a discrete set of data is received from the sensors 104. For example, if the media data is video data, the media stream module may record a timestamp for each video frame. The media stream module 126 may send, at step 306, the timestamp to the integration module 130. The media stream module 126 may send, at step 308, the media feed to the mobile device 108. The media stream module 126 may determine, at step 310, if the live event 102 has ended. If the live event 102 has not ended, the media stream module 126 may return, at step 312, to step 302. If the live event 102 has ended, the media stream module 126 may return, at step 314, to the dual-stream base module 124.

FIG. 4 illustrates the wager stream module 128. The process may begin with the wager stream module 128 being initiated, at step 400, by the dual-stream base module 124. The wager stream module 128 may poll, at step 402, for wager data from the odds calculation module 122. This data may be received when a wager is first offered at the opening of the betting market, when the betting market closes, or if the wagering options or odds change while the betting market is open. The wager stream module 128 may record, at step 404, a timestamp when data is received from the odds calculation module 122. For example, when the betting market for a play of the live event 102 has opened. The wager stream module 128 may send, at step 406, the timestamp to the integration module 130. The wager stream module 128 may send, at step 408, the wager data to the mobile device 108. The wager stream module 128 may determine, at step 410, if the live event 102 has ended. If the live event 102 has not ended, the wager stream module 128 may return, at step 412, to step 402. If the live event 102 has ended, the wager stream module 128 may return, at step 414, to the dual-stream base module 124.

FIG. 5 illustrates the integration module 130. The process may begin with the integration module 130 being initiated, at step 500, by the dual-stream base module 124. The integration module 130 may poll, at step 502, for a timestamp from the wager stream module 128. The integration module 130 may receive, at step 504, a timestamp from the wager stream module 128. The integration module 130 may poll, at step 506, for a timestamp from the media stream module 126. This step may occur concurrently to step 502, or the integration module 130 may not poll for a timestamp from the media steam module 126 until a timestamp is received from the wager stream module 128. The integration module 130 may receive, at step 508, a timestamp from the media stream module 126. The integration module 130 may synchronize, at step 510, the wager events to the media feed. For example, the wagering market for a play opens at 9:15:00 PM. The video recording of the live event 102 began at 9:00:00 PM. The corresponding timestamp in the media feed, assuming 60 frames per second, occurs at the 54,000th frame of the video recording of the live event 102. Then, the market opening would be synchronized to frame 54,000 (frame 1 of minute 15) of the media feed. The frame rate for the video of the live event 102 may be different than 60 frames per second. Each frame of the video stream may be embedded in the stream metadata such that the current frame of the video stream may be identified by the mobile device 108. The integration module 130 may send, at step 512, the synchronization data to the mobile device 108. This data may be used to synchronize the wager stream with the media stream on the wagering app 110. For example, the wagering market for a play opens at 9:15:00 PM. The opening of the market is synchronized to frame 54,000 of the media feed. The mobile device 108 receives data that the wagering market is open at 9:15:01 PM. The mobile device 108 receives synchronization data at 9:15:02 PM. The mobile device 108 receives frame 54,000 of the media feed at 9:15:09 PM. The wagering app 110 may delay displaying that the wagering market has opened until frame 54,000 is received by the mobile device 108. Therefore, the user may see that the wagering market is open at 9:15:09 PM. This delayed display may be an option selected by the user on the wagering app 110. The integration module 130 may determine, at step 514, if the live event 102 has ended. If the live event 102 has not ended, the integration module 130 may return, at step 516, to step 502. If the live event 102 has ended, the integration module 130 may return, at step 518, to the dual-stream base module 124.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for compensating for network latency for a sports betting game, comprising:

providing the sports betting game on a network, the sports betting game associated with at least a live sporting event;

sending a first stream of data to a mobile device, the first stream of data comprising wager data;

sending a second stream of data to the mobile device, the second stream of data comprising media data; and integrating the first stream of data and the second stream of data based on at least one of one or more timestamps of the first stream of data and one or more timestamps of the second stream of data, wherein integrating comprises delaying, based on said timestamps, the sending of at least one of the first stream of data and the second stream of data.

2. The method for compensating for network latency for the sports betting game of claim 1, further comprising:

providing, on the mobile device, a wagering interface based on the integration of the first stream of data and the second stream of data.

3. The method for compensating for network latency for the sports betting game of claim 1, further comprising recording a first timestamp on the first stream of data when a discrete set of data is received by one or more sensors at the live sporting event.

4. The method for compensating for network latency for the sports betting game of claim 3, further comprising sending the first timestamp to an integration module and sending the first stream of data and the second stream of data to the mobile device at a time associated with the first timestamp.

5. The method for compensating for network latency for the sports betting game of claim 1, further comprising recording a second timestamp at a time when the wagering data is available.

6. The method for compensating for network latency for the sports betting game of claim 5, further comprising sending the second timestamp to an integration module and sending the first stream of data and the second stream of data to the mobile device at a time associated with the second timestamp.

7. The method for compensating for network latency for the sports betting game of claim 1, further comprising displaying the first stream of data on the mobile device; and delaying display of the second stream of data on the mobile device until a time when the first stream of data is displayed on the mobile device.

8. The method for compensating for network latency for the sports betting game of claim 1, further comprising initiating a media stream module to collect sensor data by a dual-stream module on the network and sending the sensor data to the mobile device as the media data; and initiating, by the dual-stream module, a wager stream module on the network to retrieve wager data from an odds calculation module and sending the wager data to the mobile device.

9. A system for synchronizing display of multiple data streams on a device, comprising:

a device configured to display at least wager data and media data associated with a live sporting event;

a first data stream transmitted to the device, the first data stream comprising the media data;

a second data stream transmitted to the device, the second data stream comprising the wager data; and an integration module that delays transmission of at least one of the first data stream and the second data stream to the device based at least one of one or more timestamps of the first stream of data and one or more timestamps of the second stream of data.

10. The system for synchronizing display of multiple data streams on the device of claim 9, further comprising:

a wagering game accessible via the device.

11. The system for synchronizing display of multiple data streams on the device of claim 9, wherein the integration further considers a framerate of the first stream of data when delaying transmission.

12. The system for synchronizing display of multiple data streams on the device of claim 9, further comprising one or more sensors that sense and transmit data from the live sporting event.

13. The system for synchronizing display of multiple data streams on the device of claim 9, wherein a first timestamp is recorded on the first stream of data when a discrete set of data is received by one or more sensors at the live sporting event.

14. The system for synchronizing display of multiple data streams on the device of claim 13, wherein the integration module transmits the first stream of data and the second stream of data to the mobile device at a time associated with the first timestamp.

15. The system for synchronizing display of multiple data streams on the device of claim 9, wherein a second time-stamp is recorded on the second stream of data when wagering data is made available.

16. The system for synchronizing display of multiple data streams on the device of claim 15, wherein the integration module transmits the first stream of data and the second stream of data to the mobile device at a time associated with the second timestamp.

* * * * *